United States Patent [19]

Fitton et al.

[11] 4,075,280

[45] Feb. 21, 1978

[54] PREPARATION OF IMPROVED ZEOLITES

[75] Inventors: Robert Charles Fitton, Bel Air; Barbara Ann Fiore, Baltimore, both of Md.

[73] Assignee: J. M. Huber Corporation, Locust, N.J.

[21] Appl. No.: 727,822

[22] Filed: Sept. 28, 1976

[51] Int. Cl.$^2$ ............................................. C01B 33/28
[52] U.S. Cl. ..................................... 423/118; 423/328
[58] Field of Search ............... 423/118, 328, 329, 330; 252/455 Z

[56] References Cited

U.S. PATENT DOCUMENTS

| | | | |
|---|---|---|---|
| 3,114,603 | 12/1963 | Howell | 423/118 |
| 3,185,544 | 5/1965 | Maher | 423/118 |
| 3,398,008 | 8/1968 | Jacobs et al. | 423/118 |
| 3,985,669 | 10/1976 | Krummel et al. | 252/89 R |

FOREIGN PATENT DOCUMENTS 1,223,592  2/1971  United Kingdom ................ 423/329

OTHER PUBLICATIONS

Sotirova et al. "Chemical Abstracts" vol. 77, 1972, 77363t.

Primary Examiner—Edward J. Meros
Attorney, Agent, or Firm—Robert L. Price; Harold H. Flanders

[57] ABSTRACT

There is disclosed a process for preparation of improved zeolites such as zeolite A having increased ion exchange capacities, and improved usefulness in detergent and water purification applications, which comprises reaction of a calcined clay under conditions of high shear in contact with a portion of an alkali metal hydroxide solution, thereafter gradually increasing the temperature of the resulting mixture while adding the additional amount of alkali metal hydroxide solution under conditions of high shear, and recovering the zeolite product. Also disclosed is a process for addition of an iron complexing agent to the mixture to improve color of the final product.

19 Claims, 2 Drawing Figures

S.E.M. 2000X

S.E.M. 2000X

PREPARATION OF IMPROVED ZEOLITES

BACKGROUND OF THE INVENTION

FIELD OF THE INVENTION

This invention relates to a process for preparing synthetic zeolitic materials such as zeolite A and more particularly to a novel process for the preparation of zeolitic compositions which have improved ion exchange capacities.

DESCRIPTION OF THE PRIOR ART

Naturally occurring hydrated metal aluminum silicates are called zeolites and a great deal of patent and related art is concerned with materials of this type. In recent years, a large number of zeolites have been synthesized for use in various areas and significant differences are apparent between the natural and synthetic zeolites. A basic patent covering synthetic molecular sieves is U.S. Pat. No. 2,882,243 to Milton, issued Apr. 14, 1959, which is concerned with and describes a zeolitic material known as zeolite A. Zeolite A is a synthetic molecular sieve described in this patent as a three-dimensional crystalline framework of $SiO_4$ and $ALO_4$ tetrahedra which are cross-linked by the sharing of oxygen atoms in certain proportions. As described in the patent, zeolite A is distinguished from other zeolites and silicates on the basis of its X-ray powder diffraction pattern and is prepared from a sodium alumino silicate/water mixture having certain specific mole ratios and maintaining this mixture at 20°-175° C. until crystals are formed and separating the crystals.

Since the recognition of zeolite A as a novel and useful zeolitic molecular sieve, other art has been concerned with methods for the preparation of this zeolite A material. Of these patents, of most interest to the present invention is U.S. Pat. No. 3,114,603 to Howell which discloses a process for the production of synthetic zeolite A from Kaolin-type materials by a process comprising digesting an aqueous reaction mixture containing the clay type materials. The digestion is carried out by contact of a calcined clay with a sodium hydroxide solution at temperatures of 20°-55° C initially, followed by increasing the temperature to at least 75° C under agitation for a sufficient period to crystallize the zeolite product.

A similar reaction is disclosed in U.S. Pat. No. 2,992,068 to Haden et al. Which describes a process for the production of crystalline zeolites from dehydrated kaolin clay with dehydration of the clay being carried out by calcination at temperatures of 800°-1600° F to completely remove the water of crystallization from the clay. The dehydrated kaolin clay is then contacted with an aqueous solution of sodium hydroxide at a temperature in the range of 70°-115° F until a homogeneous amorphous reaction product is formed. The resulting reaction product is then aged in the presence of water at a temperature of from 70°-325° F to convert the amorphous product to a homogeneous polycrystalline zeolitic mass.

Similar processes are disclosed in U.S. Pat. Nos. 2,847,280 to Estes and 2,841,471 to Sensel, both of which disclose processes comprising contact of a clay-like material with an alkali metal solution such as sodium hydroxide, to form a zeolite A product under elevated temperature conditions.

The present invention provides improvements over these prior processes and methods for the production of zeolitic materials and particularly zeolite A products having improved characteristics over similar products known to the art.

SUMMARY OF THE INVENTION

It is accordingly one object of this invention to provide an improved method for the production of zeolite materials.

A further object of the invention is to provide a method for the production of an improved pure zeolite A product having increased ion exchange capacity and more uniform particle size.

A still further object of the invention is to provide a method for the production of pure zeolite A materials having improved chemical characteristics by reaction of a calcined clay and an alkali metal hydroxide solution wherein the reaction is conducted under conditions of high shear.

A still further object of the invention is to provide a method for the production of improved zeolite A products having improved ion exchange capacity and better color.

Other objects and advantages of the present invention will become apparent as the description thereof proceeds.

In satisfaction of the foregoing objects and advantages there is provided by this invention a method for the production of zeolite materials, such as zeolite A, which comprises the reaction of a calcined clay with an aqueous alkali metal hydroxide solution under conditions of high shear in a first digestion stage, the amount of alkali metal hydroxide solution being 15-40 weight percent of the total weight of the alkali metal hydroxide contained in the total final batch (both solid and liquid phases) composition, the digestion step being conducted at a temperature of about 40°-65° C, thereafter gradually increasing the temperature of the mixture to the range of 80°-100° C under conditions of high shear, adding the remainder of the alkali metal hydroxide solution, filtering the resulting mixture and recovering the zeolitic product. Also provided by this invention is a method for improving the color of the final product which comprises the addition of an iron complexing agent to the mixture.

BRIEF DESCRIPTION OF THE DRAWING

Reference is now made to the drawings accompanying this invention wherein it will be seen that.

DESCRIPTION OF PREFERRED EMBODIMENTS

Figure 1:
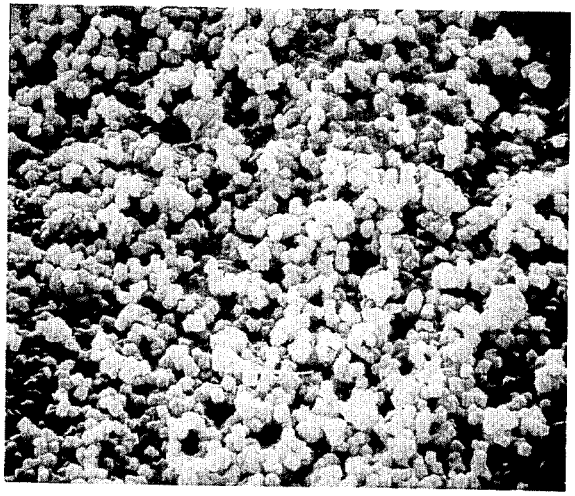
FIG. 1 represents a zeolite A material prepared according to the method of the present invention.

The present invention is concerned with a method for the production of zeolitic materials by the reaction of calcined clays with a source of alkali metal in an aqueous solution. The invention will be particularly described with respect to the preparation of zeolite A as this represents a preferred aspect of the invention.

According to the novel steps of the present invention, it has been found that improved zeolite products are produced and recovered with the improvements being found in the increased ion exchange capacity of the products, more uniform particle size range and improved color of the final product.

As indicated above, zeolite A is a synthetic three-dimensional crystalline zeolite of the molecular sieve type, which upon activation by the removal of at least part of its water of crystallization, the crystal structure remains intact and is characterized by the possession of internal adsorption areas accessible through openings or pores of definite dimensions. When zeolite A is synthesized from reactant mixtures containing substantial amounts of sodium cations, the sodium form is obtained which when activated is particularly useful for the adsorption of molecules having critical dimensions smaller than about 4 Angstrom units while refusing larger sized molecules.

Sodium zeolite A is a synthetic rigid three-dimensional crystalline zeolite of the molecular sieve type consisting basically of a rigid three-dimensional framework of $SiO_4$ and $AlO_4$ tetrahedra. The tetrahedra are cross-linked by the sharing of oxygen atoms so that the ratio of oxygen atoms to the total of the aluminum and silicon atoms is equal to two, or $$O/(AL + Si) = 2.$$

The electrovalence of each tetrahedra containing aluminum is balanced by the inclusion in the crystal of a cation, for example, an alkali or alkaline earth metal ion. One cation may be exchanged for another by various ion exchange techniques. The spaces between the tetrahedra are occupied by water molecules prior to dehydration or activation of the crystal.

The various types of crystalline molecular sieve zeolites may among other ways be differentiated on the basis of adsorption pore size or the operative pore diameter defined by the crystal structure. They are also distinguishable by virtue of the particular cation or cations such as sodium or calcium which have been integrated into the crystal.

The present invention provides an improved zeolite A base exchange crystalline material of specific crystalline size having a rapid and high ion exchange rate. This exchange rate is effective at very low concentrations of the base exchange material.

The process of this invention utilizes a calcined kaolin-type clay as the initial starting material.

Kaolin-type clays are minerals which have the general composition approximately $AL_2O_3.2SiO_2.2—4H_2O$. These kaolin-type clays, sometimes called two-layer clays, may be considered as sheet-like silicates exhibiting various degrees of crystallinity. Their basic structural unit is an aluminosilicate sheet consisting of a layer of silicon cations in tetrahedral co-ordination with oxygen anions, bonded to a layer of aluminum cations in octahedral co-ordination with oxygen or hydroxyl anions. These sheets are stacked one on top of another to form the small plate-like crystals of the mineral. Representative of the clay minerals which contain this two-layer sheet and which may be used in the process of this invention are: kaolinite, nacrite, dickite, endellite and halloysite. They differ only in the way that the basic structural sheets are stacked. Pure kaolinite, $AL_2O_3.2SiO_2.2H_2O$, has the composition by weight

| Composition | Percent |
|---|---|
| $Al_2O_3$ | 39.56 |
| $SiO_2$ | 46.54 |
| $H_2O$ (combined) | 13.90 |

Kaolin-type clays are also known by such names as "ball clay", "fireclay", "papermaking clay", "filler clay", "coating clay", and "china clay". Commercial kaolins may be contaminated with quartz, fine-grained mica, hydrous micas and sometimes feldspar, but their presence at impurity levels will generally not be detrimental to either the process or the zeolite A product.

The kaolin-type clay materials must be calcined in order to be useful or reactive for this process. A calcination temperature of about 600°–900° C is required in order to cause the kaolin material to pass through a transition in which the crystallinity of the kaolin is destroyed or altered resulting in an amorphous material called metakaolin. The preferred temperature is about 700°–850° C for a period of about one hour, with the time dependent on the equipment employed, as will be understood by those skilled in the art. Variations in the time-temperature product are also known by those skilled in the art to exist based on the particle size, degree of crystallinity, and other variations found among clays. Insufficient calcination at a low temperature, e.g. 550°–600° C, will not cause complete transition of the kaolin to the reactive metakaolin phase and use of the incompletely calcined material in this process will result in increased amounts of undesirable hydroxy-sodalite. Calcination at temperatures exceeding about 850° C will cause the formation of mixtures of a non-reactive gamma-aluminum oxide and relatively non-reactive silica which at higher temperatures, will undergo mullite transformations and which will in general result in the production of impurities via the process of this invention.

The resultant calcined clay is then slurried in water for reaction with a source of alkali metal. The alkali metal may be obtained from any suitable source but is preferably an alkali metal hydroxide or a recycle of the batch mother liquor which contains alkali metal aluminate. Reaction of the calcined clay with the alkali metal hydroxide solution is carried out preferably using at least the stoichiometrically sufficient amount of alkali metal hydroxide to provide sufficient alkali metal ions required to form the alkali metal aluminosilicate zeolite A material. The preferred alkali metal hydroxide is sodium hydroxide to produce the sodium form of zeolite A although KOH may also be used. The alkali metal hydroxide can be added to the slurry of calcined clay as an aqueous solution or in solid form.

An important feature of the present invention is that in this initial step, the calcined clay is reacted with about 15–40 wt. %, preferably 20 wt. %, of the total amount of alkali metal hydroxide (e.g. NaOH) ultimately used in producing the zeolite A product and mother liquor liquid phase. In the total reaction including all digestion stages, it is preferred that there be employed about 3 moles excess of alkali metal oxide over the amount of alkali metal oxide contained in the zeolite A. This amount may be varied within the limits described herein. Of the total amount of alkali metal oxide used, about 1 mole represents the amount necessary to form the zeolite A product. The remainder will then be present in the liquid phase or mother liquor and is suitable for recycle to the initial digestion step as described herein. Thus, in the initial step, the calcined clay and about 15–40 wt. % of the amount of alkali metal hydroxide are mixed and then digested at a temperature of about 40°–65° C for a short period, e.g. about one-half to two hours, preferably one hour, to result in a first digestion stage. The entire digestion stage is conducted under conditions of high shear, the term "high shear" being described hereinafter.

At the conclusion of this initial or digestion stage, the temperature of the resulting mixture is then gradually raised to a temperature in the range of 80°–100° C, while continuing the conditions of high shear. After elevation of the temperature, the remainder of the alkali metal hydroxide is added to the mixture as a solution or solid while continuing the conditions of high shear. Alternatively, addition of the remainder of the alkali metal hydroxide may be started during elevation of the temperature. Addition of the alkali metal hydroxide should be gradual as by metering.

On completion of the addition of alkali metal hydroxide, the conditions of high shear agitation and heating may be continued for a short period and then stopped. The mixture is then allowed to stand and crystallization allowed to proceed as the mixture cools. Cooling is effected merely by the removal of the external heat as no external cooling is required. The crystallization period may range from about one hour to four hours. However, if desired, the high speed agitation may be continued during this final crystallization period. The solid crystallized zeolite product is then recovered as by filtration. A further and important feature of the invention is that the filtrate recovered from the filtration is an alkali metal aluminate solution which is suitable for recycle to the initial and/or final digestion stage to provide at least a portion of the alkali metal and aluminate ions for preparation of additional product.

As indicated above, the reaction is conducted under conditions of high shear. By conditions of "high shear" is meant that the reaction should be carried out under high dispersive agitation. This dispersive agitation or force can be generated by shear, attrition or impingement using equipment such as a Cowles Disperser, Kady Mill, Bead or Sand Mill, Stone Mill and the like. The dispersive agitation, which, under the conditions employed, may be termed an anti-composition force, must have sufficient magnitude and intensity to establish high shear zones and intense turbulence and maintain each crystal in a discrete, segregated condition.

The agitation conditions employed in practicing the invention included use of a 4 inch (10.16 cm) Cowles blade run at 9000 RPM which gave a peripheral speed of 287,267 cm/min or 9415 ft/min. This created high shear and intense turbulence in a reactor 12 inch (30.5 cm) in diameter. This shear is sufficient in magnitude to disperse the calcined clay or metakaolin and establish and maintain each crystal formed as a discrete, segreated particle or crystal.

The process can be carried out batchwise or with recycle of the mother liquor obtained from the filtration. In the latter closed system reaction, the filtrate or mother liquor is an alkali metal aluminate aqueous solution which can be recycled to the initial step. Preferably, prior to recycling, sufficient alkali metal hydroxide is added to the mother liquor to obtain any desired predetermined molar ratio and concentration of alkali metal aluminate in the mixture. The resulting solution may then be added to the slurry of calcined clay under the high shear conditions to provide alkali metal and aluminate ions in the first stage digestion or subsequent stages. Addition of the alkali metal aluminate solution to the calcined clay is preferably carried out by gradual addition. Because of the improved economics of the process and ease of operation, recycle of the mother liquor or filtrate represents a preferred embodiment of the process.

During the reaction, the calcined clay of the general formula:

$$Al_2O_3.2SiO_2$$

will be converted to one mole of the product of the formula $Na_2O.Al_2O_3.2SiO_2:XH_2O$ when using a batch composition of $3Na_2O.Al_2O_3.2SiO_2$ in aqueous solution. On filtration, the resulting filtrate or mother liquor is highly alkaline containing predominantly $Na_2O$ and small amounts of $Al_2O_3$. Thus, since this material can be used in formation of additional product, recycle of the mother liquor or filtrate for reuse represents an economic advantage.

A further feature of the invention resides in improving the color of the final product. In this regard, during the step of calcination, the brightness of the kaolin clays is usually reduced and the brightness of the crystalline product resulting from this process will be close to that of the calcined kaolin or metakaolin. However, it has further been found that the introduction of an iron-complexing agent to this process will increase the brightness of the crystalline product 6–8 points, for example from 81 to 87–89, by preventing precipitation of iron during the crystallization step.

The iron is contained in the clay as an impurity and the amount of iron-complexing agent to be added should be sufficient to combine with the amount of iron contained in the mixture. The preferred iron-complexing agent is sodium gluconate; however, other materials may also be used such as citric acid, tartaric acid, ethylenediamine tetraacetic acid (EDTA), nitrilotriacetic acid (NTA), or metal salts of these complexing agents. The complexing agent may be added during any stage of the reaction prior to crystallization but is preferably added during the initial digestion stage.

A further preferred feature of the invention is that the resulting product solid or filter cake can be washed countercurrently, preferably using a solution of alkali metal aluminate rather than water as this serves to lessen the possibility of precipitation of $Al(OH)_3$ from the $NaAlO_2$ solution. It also reduces the amount of fresh water required to be added to the closed system and further enhances the economics of the system.

It will thus be understood that the process provides a number of distinctions from, and advantages over, similar processes known to the art. Thus, the process eliminates the digestion step where all the reactants are mixed and heated at 20°–50° C for several hours. Further, the composition of the kaolin clay used will govern the $SiO_2/Al_2O_3$ mol ratio of the zeolitic product. This ratio can be changed by addition of other sources of silica or alumina; however, it is not necessary with this process in order to obtain a base exchange crystalline material having a rapid and high ion exchange rate.

If only calcined clay and NaOH are used, then the reaction composition is restricted to the variation in the mol ratio of $SiO_2/Al_2O_3$ of the clay or a 1.8–2.3 mol ratio, (=64.4 mol % $SiO_2$ −69.7 mol %). However, this process can be applied to other compositions wherein additional $SiO_2$ or $Al_2O_3$ has been added from other sources. The recycling of the sodium aluminate mother liquor in effect increases the $Al_2O_3$ content of the reaction composition above that of the theoretical $Al_2O_3$ of the metakaolin.

In this process, the initial digestion step only requires about one hour at a temperature of about 45°–65°C. Thus, the process allows a higher digestion temperature to reduce the digestion time since only about 15-40% of the Na$_2$O has been added. The increase in the temperature to about 80°-100° C in the second stage, then allowing to cool to 80°-95° C toward the end of the crystallization time reduces the chance of sodalite formation. In the first 1½ to 2 hours of crystallization time, the recycled, concentrated purified mother liquor is added to the NaOH-metakaolin slurry to bring the batch to the desired composition during the high shear agitation. After the addition of the mother liquor, the agitation can be stopped and the final 1½-2 hours of crystallization are done under static conditions. Tests show that the reaction is complete just after the last of the mother liquor has been added. The additional crystallization time allows the crystals to become well formed.

The recycling of the mother liquor allows recovery of 70-80% of the Na$_2$O used plus some of the Al$_2$O$_3$. It also increases the Al$_2$O$_3$ composition of the batch above the value that would be attained if metakaolin and caustic were used without recycling the mother liquor. The molar ratio and concentration of Na$_2$O and Al$_2$O$_3$ in the mother liquor will be dependent upon the composition used to crystallize the base exchange material.

Without the high shear agitation, a crystallizaion time of about 7 hours would be required instead of 4 hours to get the same percentage of crystalline product. Further, the product from a 7 hour low-shear agitation does not have the ion exchange rate or capacity and the crystals would not be discrete crystals but rather clusters of crystals grown together.

This process does not require any other source of Al$_2$O$_3$ other than that obtained from the clay. This makes the process independent of other aluminum sources such as bauxite which is used in processes using sodium silicate and sodium aluminate. Further, the process can be used to produce other types of crystalline material, e.g. K or Ca forms of zeolite A.

The product resulting from the process of the present invention is a zeolite A material characterized by high ion exchange capacity and having a general formula as follows:

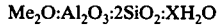

wherein Me is alkali metal, and X is O or an integer of up to about 5. The molar ratio of Me$_2$O:Al$_2$O$_3$:SiO$_2$ is preferably in the range of about 1.0 ± 0.2:1:1.85 ± 0.5, and most preferably is about 1.0:1.0:2.0.

The product has a particle size range of about 0.25 to 8 microns.

The uniform particle sizes of the products of the invention are illustrated by FIG. 1 in the drawing accompanying the present invention. In FIG. 1, it will be seen that the zeolite comprises generally uniform size particles with minimum clustering or aggregation. The particles of FIG. 1 are to be contrasted with that of FIG. 2, a product prepared with low agitation according to the prior art, the latter product exhibiting a large amount of crystal intergrowth.

The resultant discrete indivdual particles provide a high ion exchange capacity, which makes the products imminently useful as water softening agents where their ion or base exchange properties are evident. These properties can be evaluated by well known methods for calcium exchange capacity and exchange rates. For commercial application, the products should be able to exchange at least 250 mg. CaCO$_3$/g under the conditions of the test and should be able to deplete a 4.7 gr./gal. (calcium hardness) hard water to 2.0 gr./gal. in 1 minute and 1.0 gr./gal. in 10 minutes. In this latter test, the base exchanger is added at a 0.06% level to mixed Ca-Mg hard water with 7.0 gr./gal. hardness.

The unique high ion exchange silicates of the invention have particular utility for use in liquid or dry detergent compositions or cleaning compounds. In this regard, the silicates of the invention may be used with any of the conventional detergent classes, i.e., synthetic nonsoap anionic, nonionic and/or amphoteric surface active compounds which are suitable as cleansing agents. Anionic surface active compounds can be broadly described as compounds which contain hydrophilic or lyophilic groups in their molecular structure and which ionize in an aqueous medium to give anions containing the lyophilic group. These compounds include the sulfated or sulfonated alkyl, aryl and alkyl aryl hydrocarbons and alkali metal salts thereof, for example, sodium salts of long chain alkyl sulfates, sodium salts of alkyl naphthalene sulfonic acids, sodium salts of sulfonated abietenes, sodium salts of alkyl benzene sulfonic acids particularly those in which the alkyl group contains from 8-24 carbon atoms; sodium salts of sulfonated mineral oils and sodium salts of sulfosuccinic acid esters such as sodium dioctyl sulfo succinate.

Advantageous anionic surfactants include the higher alkyl aryl sulfonic acids and their alkali metal and alkaline earth metal salts such as for example sodium dodecyl benzene sulfonate, sodium tridecyl sulfonate, magnesium dodecyl benzene sulfonate, potassium tetradecyl benzene sulfonate, ammonium dodecyl toluene sulfonate, lithium pentadecyl benzene sulfonate, sodium dioctyl benzene sulfonate, disodium dodecyl benzene disulfonate, disodium di-isopropyl naphthalene disulfonate and the like as well as the alkali metal salts of fatty alcohol esters of sulfuric and sulfonic acids, the alkali metal salts of alkyl aryl (sulfothioic acid) esters and the alkyl thiosulfuric acid, etc.

Nonionic surface active compounds can be broadly described as compounds which do not ionize but usually acquire hydrophilic characteristics from an oxygenated side chain, such as polyoxyethylene, while the lyophilic part of the molecule may come from fatty acids, phenols, alcohols, amides or amines. Examples of nonionic surfactants include products formed by condensing one or more alkylene oxides of 2 to 4 carbon atoms, such as ethylene oxide or propylene oxide, preferably ethylene oxide alone or with other alkylene oxides, with a relatively hydrophobic compound such as a fatty alcohol, fatty acid sterol, a fatty glyceride, a fatty amine, an aryl amine, a fatty mercaptan, tall oil, etc. Nonionic surface active agents also include those products produced by condensing one or more relatively lower alkyl alcohol amines (such as methanolamine, ethanolamine, propanolamine, etc.) with a fatty acid such as lauric acid, cetyl acid, tall oil fatty acid, abietic acid, etc. to produce the corresponding amide.

Particularly advantageous nonionic surface active agents are condensation products of a hydrophobic compound having at least 1 active hydrogen atom and a lower alkylene oxide (for example the condensation product of an aliphatic alcohol cntaining from about 8 to about 18 carbon atoms), and from about 3 to about 30 mols of ethylene oxide per mol of the alcohol, or the condensation product of an alkyl phenol containing from about 8 to about 18 carbon atoms in the alkyl group and from about 3 to about 30 mols of ethylene oxide per mol of alkyl phenol. Other nonionic detergents include condensation products of ethylene oxide with a hydrophobic compound formed by condensing propylene oxide with propylene glycol.

Amphoteric surface active compounds can be broadly described as compounds which have both anionic and cationic groups in the same molecule. Such compounds may be grouped into classes corresponding to the nature of the anionic-forming group, which is usually carboxy, sulfo and sulfate. Examples of such compounds include sodium N-coco beta amino propionate, sodium N-tallow beta amino dipropionate, sodium N-lauryl beta iminodipropionate and the like.

Other typical examples of these categories of the anionic, nonionic and/or amphoteric surface active agents are described in Schwartz and Perry "Surface Active Agents", Interscience Publishers, New York (1949) and the Journal of American Oil Chemists Society, Volume 34, No. 4, pages 170–216 (April 1957) which are incorporated herein by reference.

The amount of the exchange silicates necessary to be used with the surface active compound (active) may vary depending upon the end use, type of active employed, pH conditions and the like. The optimum active/exchanger ratio depends upon the particular active employed and the end use for which the detergent composition is intended but most generally will fall within the range of active/exchange silicate weight ratio of about 3:1 to 1:6.

The following examples are presented to illustrate the invention but it is not to be considered as limited thereto. In the following examples and throughtout the application, parts are by weight unless otherwise indicated.

EXAMPLE 1

A sample of reactive kaolin (metakaolin) was prepared by calcining 2167 g of kaolin at temperatures of 750° C for 1 hour resulting in 1867 g of reactive kaolin or metakaolin. This metakaolin was then slurried in 7078 g of $H_2O$ containing 860 g of 50% NaOH and added to a high shear reactor. The reactor was 12 inches in diameter, 18 inches high and had for 1inch $\times$ 12 inch baffles. The high shear agitation was generated by running a 4 inch diameter "Cowles" blade at 900 RPM. The reactor was heated by pumping hot water through the jacket of the reactor. The metakaolin slurry was digested at 60°–65° C for 1 hour under high shear. The temperature of the slurry was then raised to 90°–100° C over a 1 hour period and the addition of a sodium aluminate solution started at 96 mls/minute for 120 minutes. This sodium aluminate solution contained 1339 g $Na_2O$ and 109 g $Al_2O_3$ and represented recycling of the mother liquor or filtrate that would be generated from this reaction. The oxide mol ratio of this composition was:
$Na_2O/SiO_2$ 1.64
$SiO_2/Al_2O_3$ 1.74
$H_2O/Na_2O$ 40

At the end of the sodium aluminate addition, the agitation was stopped and the composition allowed to stand for 1½ hours to obtain optimum crystal size and shape. At the end of this period, the product was filtered and washed with distilled water to a pH of about 11. After drying at 50°–60° C for 16–20 hours the product was milled. The yield was 2906 grams.

The product of Example 1 had X-ray diffraction peaks representing only zeolite A crystals. No sodalite or hydroxysodalite peaks were detected. Compared to a standard, 93% was zeolite A. The exchange capacity was 330 mg of $CaCO_3$/g anhydrous pigment. The depletion rate test showed only 0.13 grains/gallon $CaCO_3$ left after 1 minute and <0.1 by 2 minutes. An acceptable depletion rate would reduce normal hard water of 7.0 grains $CaCO_3$/gallon to less than 2.0 grains $CaCO_3$/gallon in one minute and less than 0.5 grains/gallon in 10 minutes. The brightness of this product was 81 measured on an Elrepho Brightness meter at 457 nanometers. The average crystalline size via SEM is 1 micron. This product is that shown in FIG. 1.

EXAMPLE 2

The procedure and reactants of Example 1 were repeated except that 8.6 g of sodium gluconate were added to the slurry of metakaolin, NaOH and $H_2O$ to complex with iron present. The product of this reaction is the same as that obtained from Example 1 except that the brightness of the product was 89 as compared to 81 for that of Example 1.

EXAMPLE 3

Figure 2:
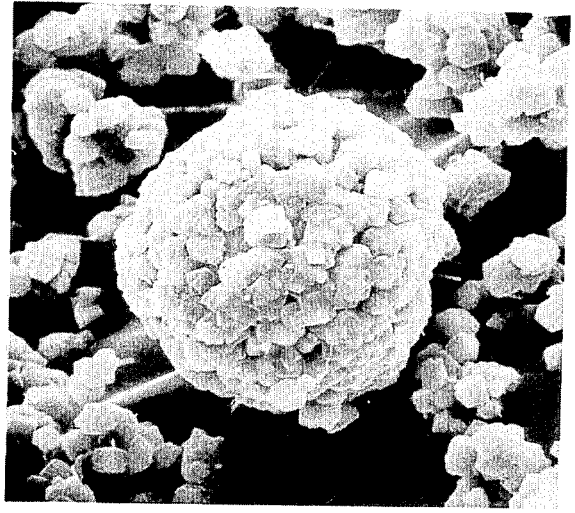
FIG. 2 represents a zeolite A material prepared according to the methods of the prior art.

The composition and procedure of Example 2 was repeated except that low shear or agitation, (sufficient to maintain a homogeneous slurry) was used. The X-ray diffraction pattern shows this material to be 88% zeolite A. Its exchange capacity was 240 mg $CaCO_3$/g anhydrous pigment, its brightness 81. The SEM shows the average crystal size to be about 2 microns with a large amount of crystal intergrowth. This product is shown in FIG. 2.

EXAMPLE 4

To a 50 gallon kettle equipped with a propeller-type mixer, the following were added:
8.187 lbs metakaolin;
5.848 lbs 50% NaOH;
60.287 lbs $H_2O$; and 4.312 lbs sodium aluminate solution This slurry was heated to 60° C and agitated for 1 hour after which the temperature was increased to 95° C and the addition of sodium aluminate started at a rate of 43 mls/minute for 180 minutes. Concentration of the sodium aluminate was 16.46% $Na_2O$, 1.93% $Al_2O_3$, 81.61% $H_2O$. Final mole-ratio composition of batch was:
$Na_2O/SiO_2$: 1.45
$SiO_2/Al_2O_3$: 1.737
$H_2O/Na_2O$: 40

Agitation was maintained during the entire reaction. This batch was allowed to crystallize with agitation for 1 hour after the addition of sodium aluminate. The product obtained on filtering and washing had the following properties.
87% zeolite A by X-ray diffraction
Exchange capacity 185 mg $CaCO_3$/g anhydrous pigment
Crystal size 2–3 microns

EXAMPLE 5

The composition of Example 4 was repeated except that all the sodium aluminate was added initially and the batch was not agitated during crystallization. The product from this reaction showed very low conversion to zeolite A and also low exchange capacity. Results were as follows:
55% zeolite A
8–10% hydroxysodalite 31 mg CaCO$_3$/g exchange capacity The invention has been described herein with reference to certain preferred embodiments. However, as obvious variations thereon will become apparent to those skilled in the art, the invention is not considered to be limited thereto.

What is claimed is:

1. A method for the production of improved zeolite A products which comprises reacting a calcined kaolin clay in a first digestion stage with a source of alkali metal in aqueous solution, the amount of alkali metal in the first digestion stage being about 15–40 wt. % of the total weight of alkali metal to be contained in the final zeolitic batch composition comprising the zeolite A product and liquid phase mother liquor, the digestion step being conducted at a temperature of about 40°–65° C and under conditions of high shear, said high shear comprising high dispersive agitation which has sufficient magnitude and intensity to establish high shear zones and intense turbulence and maintain each crystal in a discrete, segregated condition, thereafter gradually increasing the temperature of the resulting mixture to the range of about 80°–100° C while maintaining said conditions of high shear and adding the remaining 60–85 wt. % of the alkali metal to be contained in the final zeolitic batch composition while continuing the conditions of high shear, thereafter permitting the resulting mixture to cool and recovering the zeolitic A product from the mixture by separation from the mother liquor.

2. A method according to claim 1 wherein the total amount of alkali metal hydroxide reacted with the clay in the first digestive stage is an amount sufficient to provide at least the theoretical amount of alkali metal necessary to produce the zeolite A of the following formula:

$$1.0 \pm 0.2 \, Me_2O : Al_2O_3 : 1.85 \pm 0.5 \, SiO_2 : X \, H_2O$$

wherein Me is an alkali metal, and X is 0 or an integer of up to 5.

3. A method according to claim 2 wherein, after addition of the remaining alkali metal, the high shear conditions are stopped, and the mixture is allowed to cool for 1–4 hours to obtain optimum crystal growth.

4. A method according to claim 3 wherein the alkali metal is sodium hydroxide.

5. A method according to claim 1 wherein the calcined clay is derived from a kaolin-type clay which has the following general composition Al$_2$O$_3$.2SiO$_2$.2-4H$_2$O.

6. A method according to claim 5 wherein the kaolin clay is calcined by heating at a temperature of about 600°–900° C. to convert kaolin materials through a transition stage and provide an amorphous metakaolin material.

7. A method according to claim 6 wherein the calcined clay is slurried in an excess of water and the 15–40 wt. % of the total amount of alkali metal hydroxide added thereto as an aqueous solution.

8. A method according to claim 1 wherein, after the zeolite A product is recovered, the resulting mother liquor is recycled to the initial digestion stage to provide sodium aluminate ions in the first digestion stage as at least a portion of the source of the alkali metal.

9. A method according to claim 8 wherein additional alkali metal hydroxide is added to the mother liquor to adjust the ratio of alkali metal and aluminum ions in said first stage digestion.

10. A method according to claim 1 wherein an iron-complexing agent is added to the reaction mixture to improve color of the final product.

11. A method according to claim 1 wherein 20 wt. % of the total amount of alkali metal hydroxide is reacted in the first digestion step.

12. A method according to claim 1 wherein at least a portion of the remaining alkali metal hydroxide is added while gradually increasing the temperature of the mixture to 80°–100° C.

13. A method according to claim 1 wherein the mixture is allowed to cool to about 80°–95° C during the crystallization stage.

14. A method for the production of improved zeolite A products which comprises calcining a kaolin clay to convert said clay to a metakaolin phase, slurrying said calcined clay in an aqueous medium for reaction with sufficient alkali metal hydroxide to form a zeolite A product of the following general formula:

$$1.0 \pm 0.2 \, Me_2O : Al_2O_3 : 1.85 \pm 0.5 \, SiO_2 : X \, H_2O$$

wherein Me is alkali metal and X is 0 or an integer of up to 5; adding to said slurry of calcined clay about 15–40 wt. % of the total weight of alkali metal hydroxide to be contained in the final zeolitic composition which comprises the zeolite A product and liquid phase mother liquor, heating said mixture at a temperature of about 40°–65° C in a first digestion stage under conditions of high shear, said high shear comprising high dispersive agitation which has sufficient magnitude and intensity to establish high shear zones and intense turbulence and maintain each crystal in a discrete, segregated condition, thereafter gradually increasing the temperature of the resulting mixture to the range of 80°–100° C while maintaining the conditions of high shear, adding the remainder of the alkali metal hydroxide to the mixture to complete the alkali metal hydroxide addition, stopping the conditions of high shear and permitting the mixture to cool for a period of 1 to about 4 hours to obtain optimum crystal growth, separating the precipitated zeolite A product from the mother liquor containing sodium aluminate ions, and recycling the mother liquor containing the sodium aluminate ions to the first digestion stage of the next batch to supply sodium oxide ions to the initial mixture.

15. A method according to claim 14 wherein the calcined clay is derived from a kaolin-type clay which has the following general composition Al$_2$O$_3$.2SiO$_2$.2-4H$_2$O.

16. A method according to claim 15 wherein the calcined clay is slurried in an excess of water and the alkali metal hydroxide added thereto as an aqueous solution.

17. A method according to claim 14 wherein additional alkali metal hydroxide is added to the mother liquor to adjust the ratio of alkali metal and aluminum ions prior to recycle to said first stage digestion.

18. A method according to claim 14 wherein an iron-complexing agent is added to the reaction mixture to improve color of the final product.

19. A method according to claim 16 wherein 20 wt. % of the total amount of alkali metal hydroxide is reacted in the first digestion step.

* * * * *

UNITED STATES PATENT AND TRADEMARK OFFICE
CERTIFICATE OF CORRECTION

PATENT NO. : 4,075,280
DATED : February 21, 1978
INVENTOR(S) : Robert Charles Fitton and Barbara Ann Fiore It is certified that error appears in the above-identified patent and that said Letters Patent are hereby corrected as shown below:

Column 1, line 23, "$ALO_4$" should be -- $AlO_4$ --.

Column 1, line 47, following "et al." the word "Which" should be -- which --.

Column 3, lines 44 and 58, the first part of formula "$AL_2O_3$" should be -- $Al_2O_3$ --.

Column 5, lines 49-50, the hyphenated word "se-greated" should be -- segregated --.

Column 7, line 24, "crystallizaion" should be -- crystallization --.

Column 8, line 62, "cntaining" should be -- containing --.

Column 9, line 31, "throughtout" should be -- throughout --.

Column 9, line 42, "had for 1 inch" should be -- had four 1 inch --.

*Signed and Sealed this*

*Thirteenth* Day of *June 1978*

[SEAL]

*Attest:*

RUTH C. MASON
*Attesting Officer*

DONALD W. BANNER
*Commissioner of Patents and Trademarks*